Jan. 21, 1936. G. C. WOODRUFF Re. 19,831
DROP SIDE CONTAINER CAR
Original Filed April 12, 1929 9 Sheets-Sheet 1
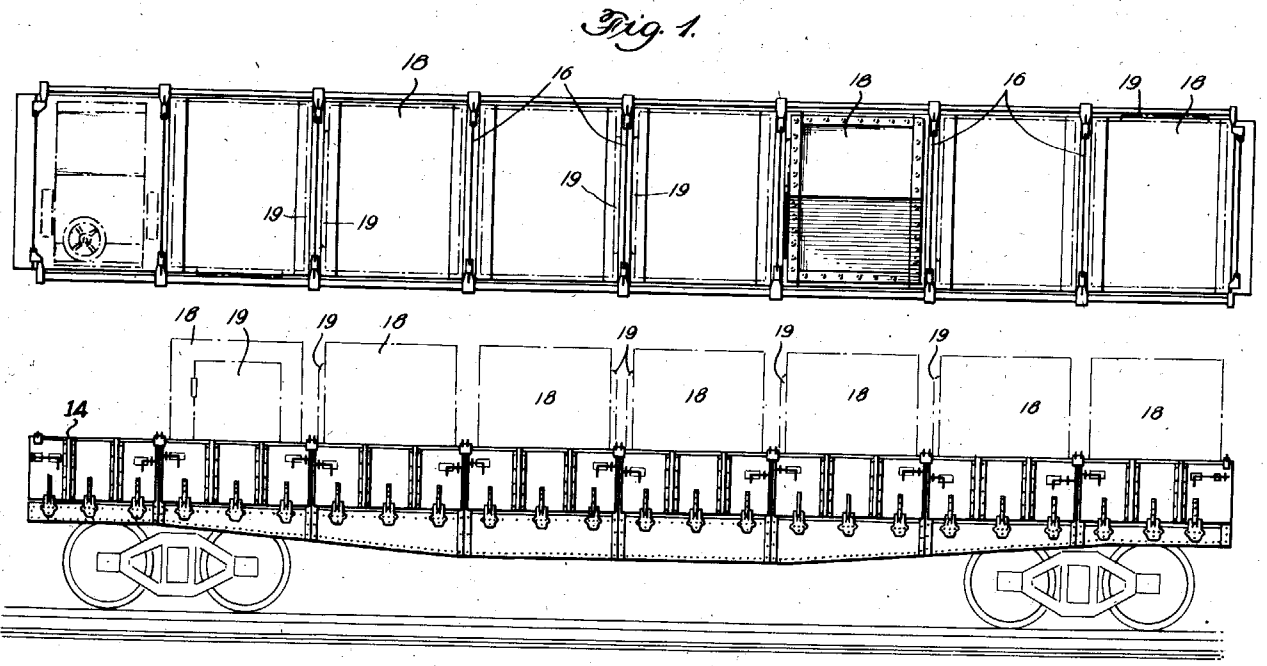
Inventor
Graham C Woodruff
By Edwin S Clarkson
Attorney Jan. 21, 1936. G. C. WOODRUFF Re. 19,831

DROP SIDE CONTAINER CAR

Original Filed April 12, 1929 9 Sheets-Sheet 2

Inventor
Graham C. Woodruff

By
Fleur S. Clarkson
Attorney

Jan. 21, 1936. G. C. WOODRUFF Re. 19,831

DROP SIDE CONTAINER CAR

Original Filed April 12, 1929 9 Sheets-Sheet 3

Inventor

Graham C Woodruff

By Edwin S Clarkson

Attorney

Jan. 21, 1936. G. C. WOODRUFF Re. 19,831
DROP SIDE CONTAINER CAR
Original Filed April 12, 1929 9 Sheets-Sheet 4
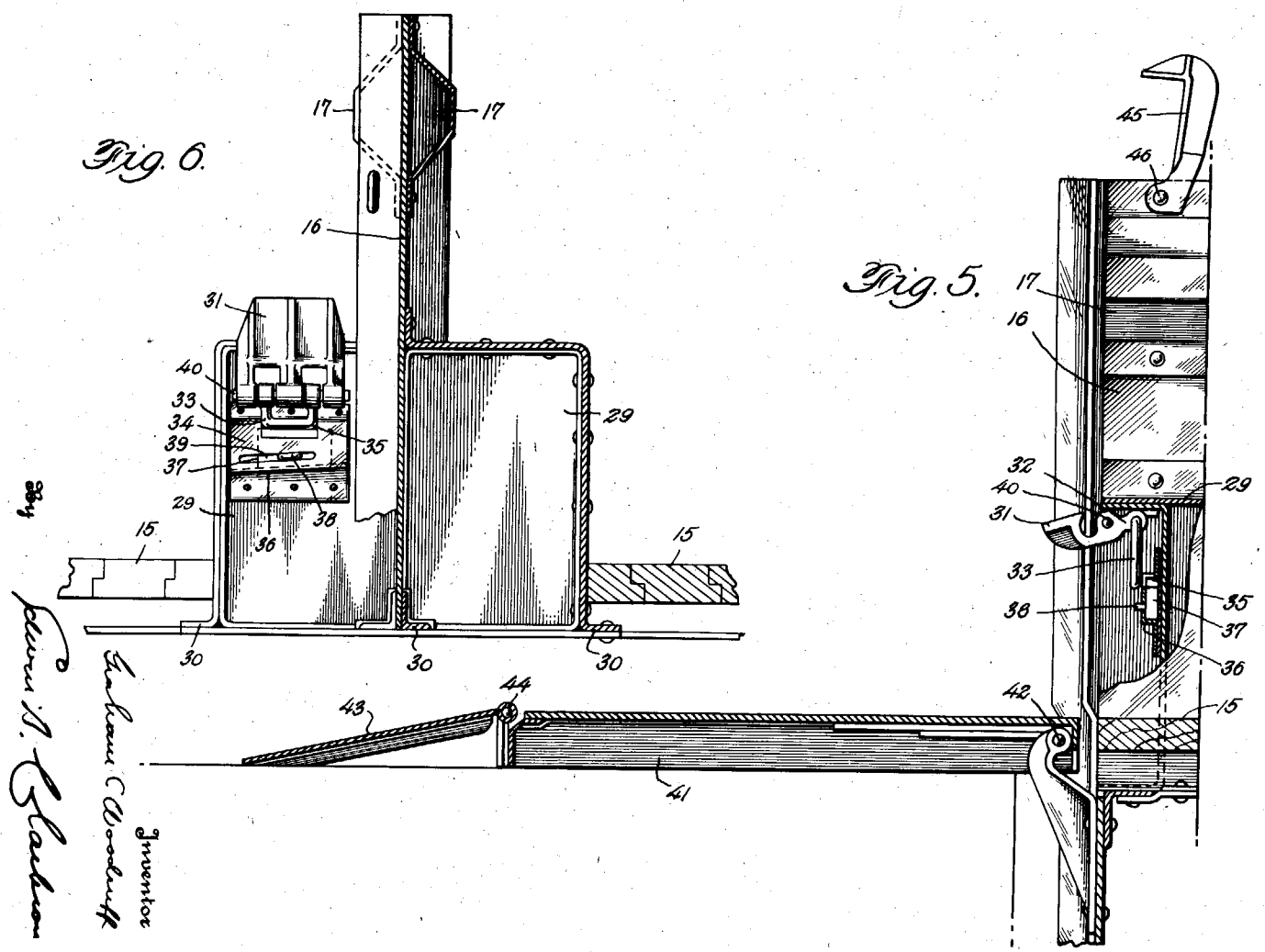
Inventor
Graham C. Woodruff
By Edwin A. Clarkson
Attorney Jan. 21, 1936. G. C. WOODRUFF Re. 19,831

DROP SIDE CONTAINER CAR

Original Filed April 12, 1929 9 Sheets-Sheet 5

Inventor

Graham C Woodruff

By Francis S Clarkson

Attorney

Jan. 21, 1936. G. C. WOODRUFF Re. 19,831

DROP SIDE CONTAINER CAR

Original Filed April 12, 1929 9 Sheets-Sheet 6

Inventor

Graham C Woodruff

By Edwin S Clarkson

Attorney

Jan. 21, 1936. G. C. WOODRUFF Re. 19,831

DROP SIDE CONTAINER CAR

Original Filed April 12, 1929 9 Sheets-Sheet 7

Inventor

Graham C Woodruff

By Fleon S Clarkson

Attorney

Jan. 21, 1936. G. C. WOODRUFF Re. 19,831

DROP SIDE CONTAINER CAR

Original Filed April 12, 1929 9 Sheets-Sheet 8

Inventor
Graham C Woodruff
By Edwin S Clarkson
Attorney

Jan. 21, 1936.
G. C. WOODRUFF
Re. 19,831
DROP SIDE CONTAINER CAR
Original Filed April 12, 1929 9 Sheets-Sheet 9
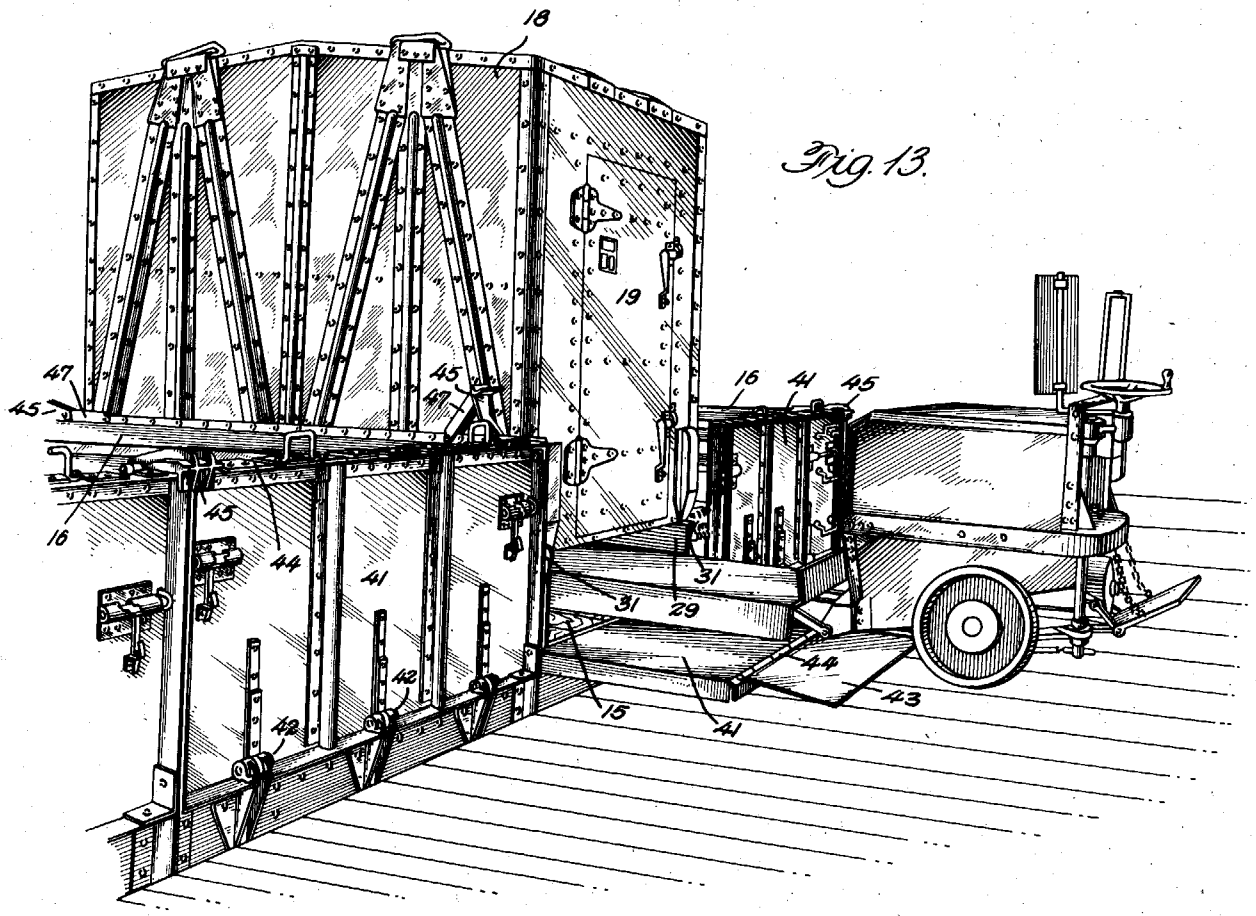
Inventor
Graham C. Woodruff
By Francis S. Clackson
Attorney Reissued Jan. 21, 1936

Re. 19,831

UNITED STATES PATENT OFFICE 19,831

DROP SIDE CONTAINER CAR

Graham C. Woodruff, Bronxville, N. Y., assignor to The L. C. L. Corporation, a corporation of Delaware Original No. 1,847,202, dated March 1, 1932, Serial No. 354,636, April 12, 1929. Reissue No. 18,577, dated August 23, 1932, Serial No. 597,850, March 9, 1932. This application for reissue August 11, 1933, Serial No. 684,772

21 Claims. (Cl. 105—366)

The methods generally in use for handling merchandise freight have not been changed in any essential aspect for a number of years past prior to the adoption by the railroads of the container car of the type invented by Alfred H. Smith, such for instance that shown in his Reissue Patent 16,073, May 19, 1925. Packages of various kinds, shapes and sizes have been and are today delivered to the railroad station and after unloading from shippers truck, are handled by railroad labor and loaded either directly into a car or more frequently placed upon the freight house floor until the car can be loaded, then trucked to and stored in the car. Due to limitations in available extra space, particularly at the larger terminals, the freight must often be loaded into the car currently as offered, which frequently results in an ill-assorted and badly loaded car because it is not possible to reassort and properly load freight by the old method to the best advantage.

The freight thus loaded into a car is transported to destination where it is taken out, placed in the freight house and later on picked up again and taken to the doorway for delivery to the consignee's truck. Often, the freight is transferred en route, and intermediate unloading and rehandling being necessary.

The cost of handling l. c. l. merchandise freight averages 12¢ to 15¢ per hundred pounds each at origin and at destination or a total of more than 25¢ per 100 lbs. of expense, which the railroad assumes for this necessary service at origin and destination ends.

The container may be used in two ways; first, for transportation from one shipper to one consignee, this in cases when one shipper alone has enough tonnage to warrant using a container; second, use of containers by consolidators who substitute themselves for individual shipper or consignee, and by gathering up large number of small shipments, produce a container load very near the maximum, and act as distributors at destination.

The advantages to the shipper are; saving in total transportation costs, saving in cost of heavy wooden cases, as packing cases are unnecessary when shipments are made in containers; saving in tare; saving incident to practical elimination of theft, damage or other source of loss; saving resulting in faster, better and more efficient service; and the advantages to the railroad are development and extension of service, having reference particularly to comparatively short haul traffic, saving of freight house labor at both origin and destination, saving of way bill expense; getting greater revenue per car mile incident to heavier loading; saving in equipment; saving from elimination of claims for pilferage and loss; saving resulting from decrease in detention of equipment at terminals; relief of freight house facilities.

The object of my invention is to make the container car operation as nearly perfect as possible by dividing the car transversely with partitions thus forming container stalls or compartments and having shelves beside these partitions extending transversely of the car to support containers with or without legs, so as to make it possible to run a lift truck onto the car under the container, lift the container from the supporting shelves and remove it to a station platform, truck body or other support. One of the advantages of legs on a container is that the lift truck may be run under the container from any one of four positions and place the container more satisfactorily, making it a much more flexible operation, than if the lift truck could go in from one or two positions and to accommodate the legs of the container I provide the supporting shelves with elongated slots or ways extending lengthwise of the shelf, so that the four legs of the container engaged with the slot will act as safety devices to prevent side sway and decrease to a minimum any possibility of the container slipping off the car. A further object is to provide doors for the ends of the compartment which when in raised position constitute the car side wall; and with these and other objects in view, my invention consists of the parts and combination of parts hereinafter pointed out.

In the drawings,

Figure 1 is a top plan view of my improved car loaded with containers and a lifting truck.

Figure 2 is a side elevation of Figure 1.

Figure 5 is a view similar to Figure 4 with the drop side door open and functioning as a gang plank.

Figure 6 is an enlarged detail view looking at the end of the supporting shelf, which is shown in elevation at the left and in section at the right, the car partition being in section.

Figure 13 is a view similar to Figure 12 showing the lift truck leaving the car after having deposited the container on the supporting shelves, the drop door functioning as a gang plank.

Figure 3:
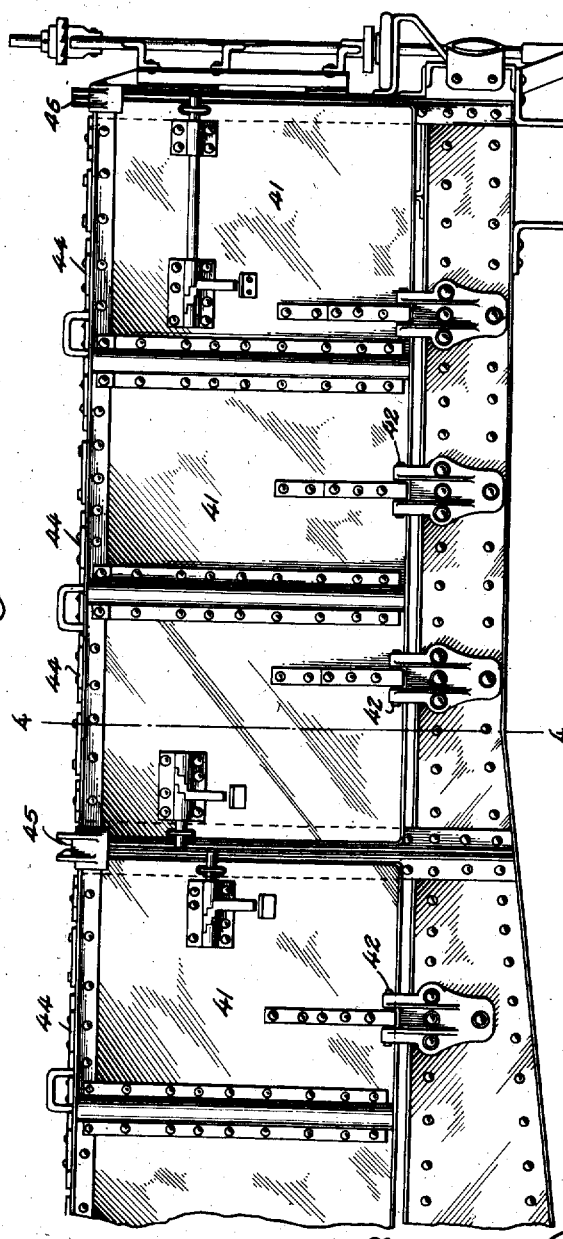
Figure 3 is an enlarged side elevation of one end portion of the car.

For the purposes of illustrating my invention I have shown a car 14 of the gondola type divided into compartments 15 by means of the transverse partitions 16, which are provided with container guides 17, which center the containers 18 in the compartments 15 as they are being loaded and also hold the containers from shifting while en route. These containers are provided with a door or doors 19 of approved type and construction, provided with approved locking bolts 20, 21, which are connected at their inner ends to a bar 22, keyed to a spindle 23 to which is also rigidly secured the operating handle 24. The outer end of the bolt 20, when in locked position projects through the top of the door into the keeper 25 in the top of the door frame, while the outer end of bolt 21, in locked position, projects through the bottom stile of the door into a keeper formed in the threshold 26 of the door frame, and is provided with a recess 27 into which one end of the dog 28 is adapted to lock to hold the bolt 21 against operation as will be hereinafter described. In this connection let it be understood that I do not in this application claim the container locking device shown herein, as that forms the subject matter of another application filed by me February 28, 1929, Serial No. 343,353.

On each side of the container compartment 15 I secure to the partitions 16, a container supporting shelf 29 which is preferably hollow or box like and is further secured to the car structure as at 30 as it is preferable that the weight imposed on the shelf be carried by the underframe, although not necessarily. At the ends of each shelf 29 I pivotally mount a container retainer lug or hook 31, which when in the operative position showing in Figures 4, 6, hold the container from slipping endwise off the supporting shelf 29. This dog is provided with an arm 32 to which is loosely secured the operating link 33. A link latch housing 34 is secured to the end of the support 29 and is provided with a recess 35 to receive the link 33. Within the housing 34 is an inclined slide way 36 provided on which a latch 37 is slidably mounted and provided with an operating handle 38 which moves in the elongated slot 39 in the housing. When the retaining lug 31 and link 33 are in the position shown in Figure 6 the latch 37 has been moved to lock the link 33 in that position and also lock the lug 31 in its locked position, whereby the retaining lug 31 is held against movement. To release the lug 31 for the purpose of removing a container, the latch 37 is moved to the left whereupon the link 33 is free to swing or be moved outward and rotate the retaining lug 31 on the pivot 40 to the position shown in Figure 5.

Figure 4:
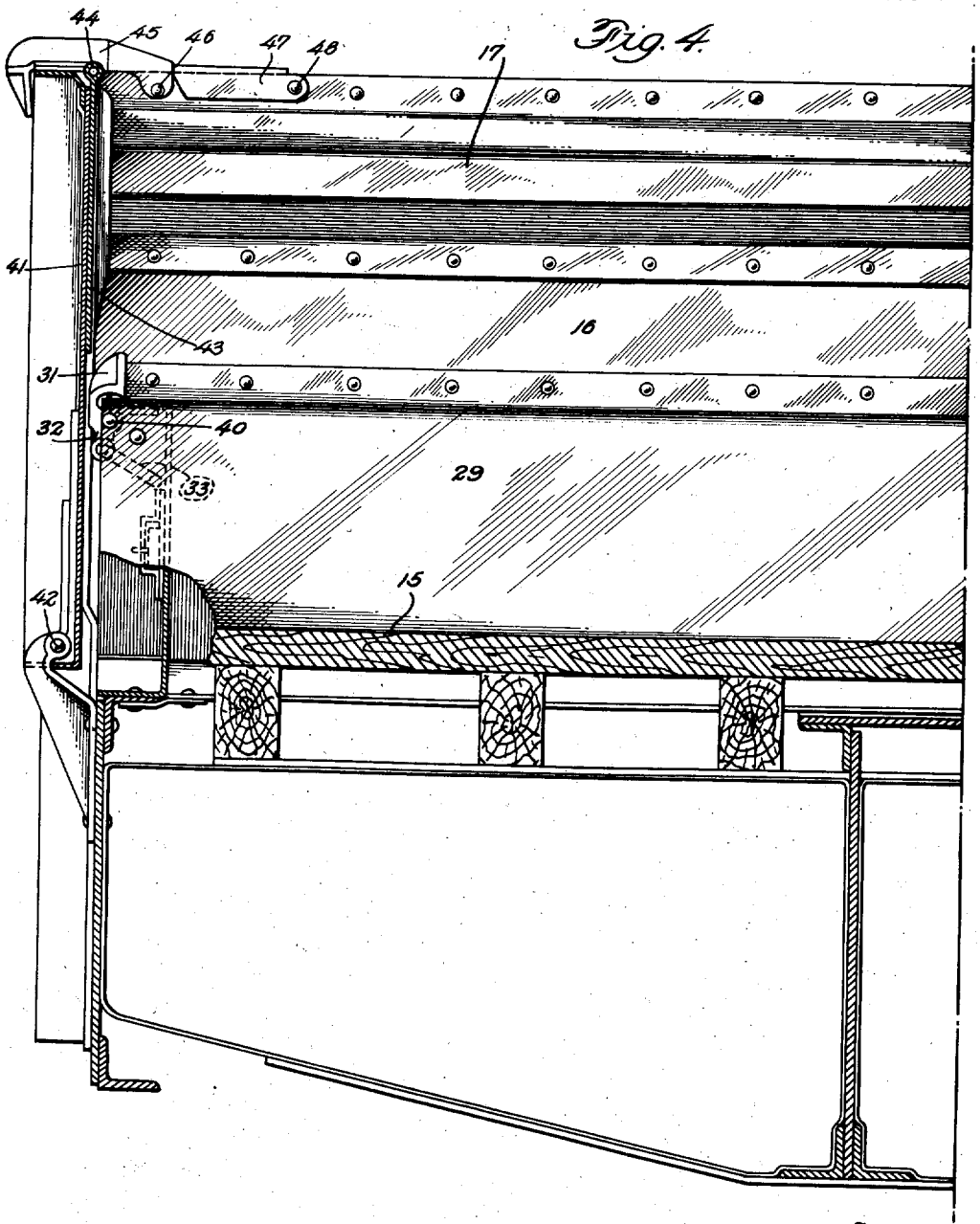
Figure 4 is a vertical sectional view on the line 4—4 of Figure 3.
Figure 7:
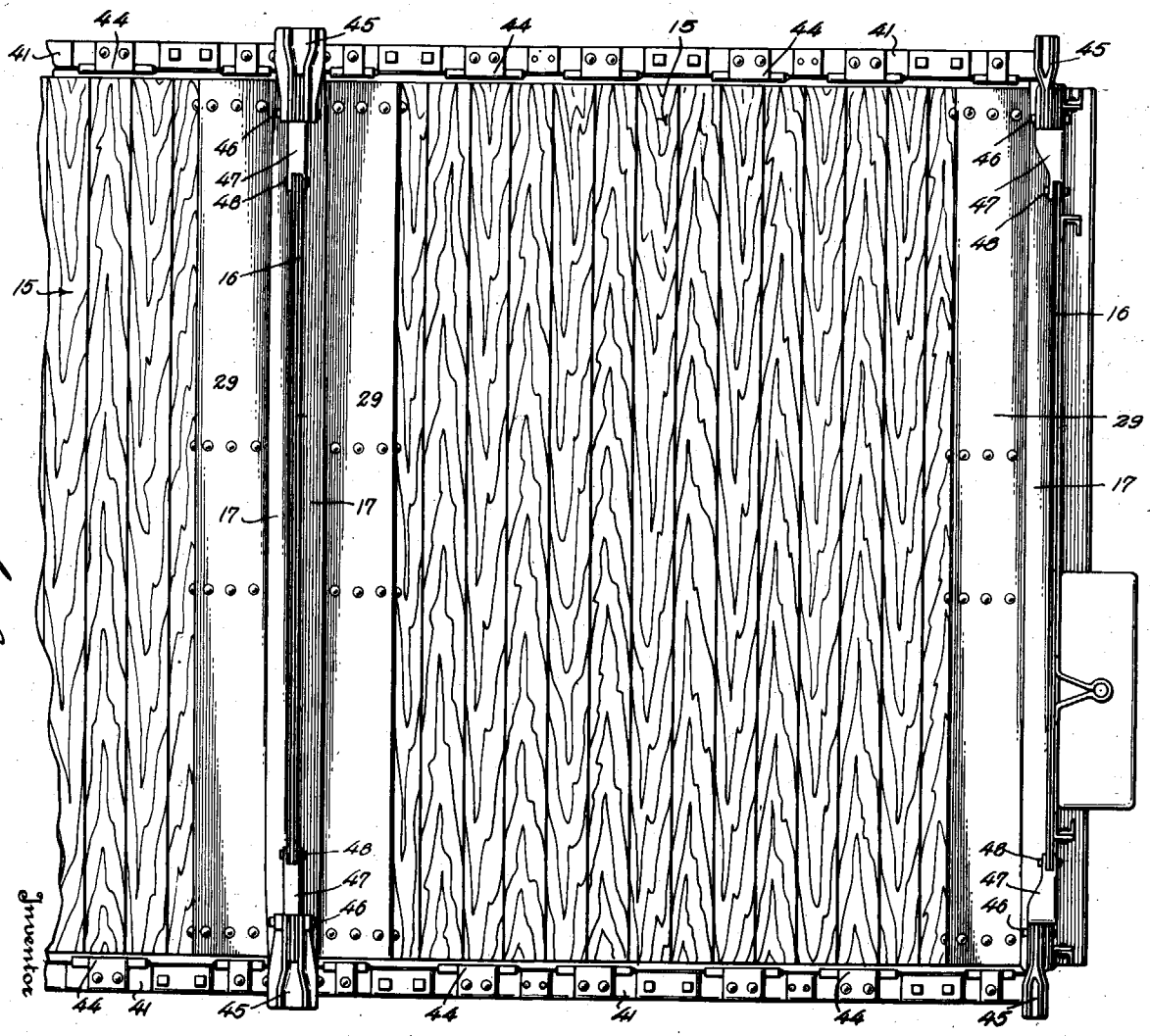
Figure 7 is an enlarged detail top plan of the empty car.
Figures 8, 9:
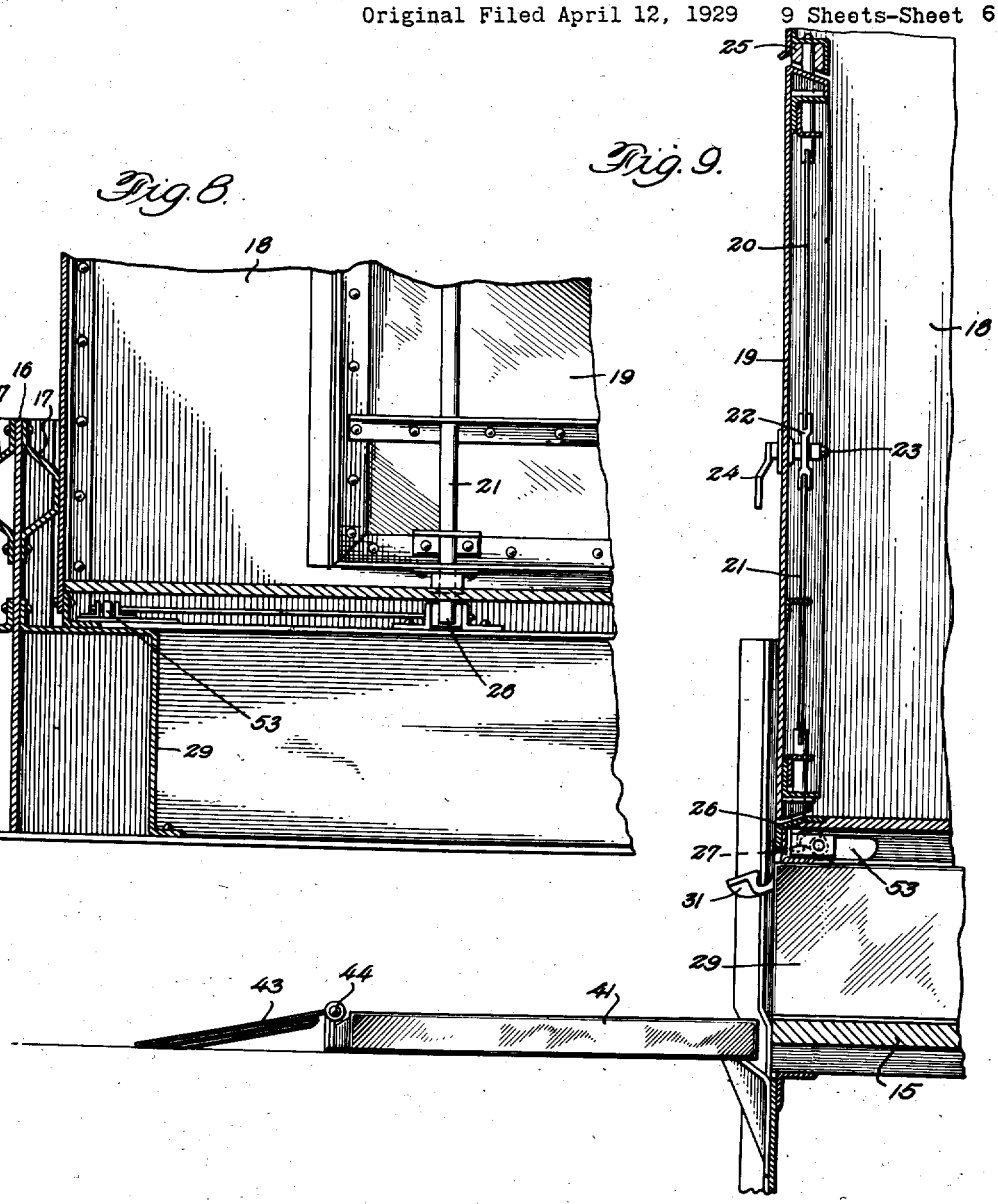
Figure 8 is an enlarged detail sectional view through the car partition, supporting shelf and container, showing the cooperation of the said shelf and a lock for the container door.
Figure 9 is a vertical section through car and container, showing the cooperation of the supporting shelf and a lock for the container door, this view being at right angles to Figure 8, and showing the drop side door open.

The drop sides or doors 41 are positioned at each end of the compartment 15 and are secured to the car by means of the hinges 42 of any approved type. An extension 43 is hinged at 44 to the top edge of the doors 41 which, when the doors are open, as shown in Figure 9 functions as a runaway for a truck to travel onto the door 41, and thence into the compartment 15. While the doors 41 are in elevated or locked position across the end of the compartment 15 the runway 43 is folded back against the inner face of the door 41 as shown in Figure 4, the door 41 being locked in its closed position by means of hooks 45 pivoted at 46 to the bulkhead or partition 16, the hook end embracing the upper edge of the door, and in order to prevent these hooks 45 from jolting out of operative position I provide a safety catch 47, pivoted at 48 to the bulkhead 16 with its forward end abutting the rear end of the hook 45 above its pivot 46. The doors 41, and runway 43 are provided with suitable bracing angle irons to assist in supporting a load transmitted across them when in the position shown in Figure 9.

Figure 10:
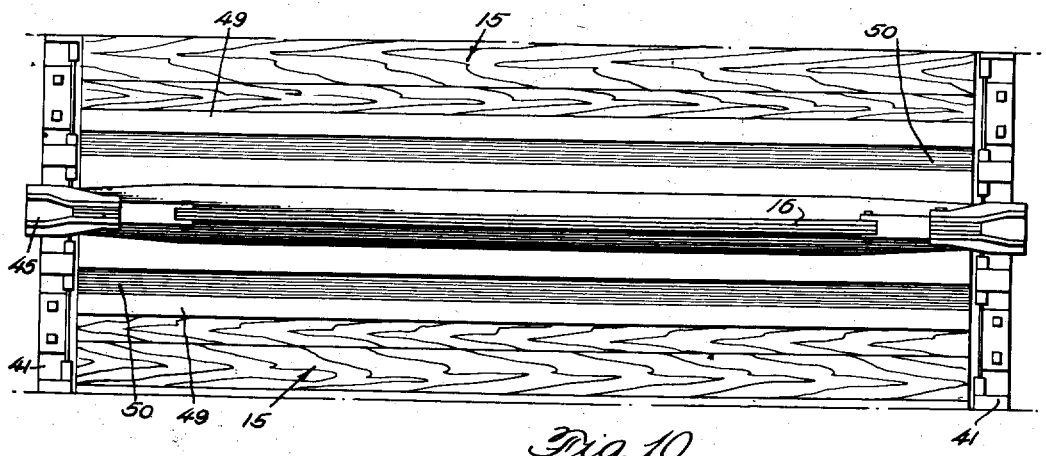
Figure 10 is a detail top plan of the partition and a portion of the car.
Figure 11:
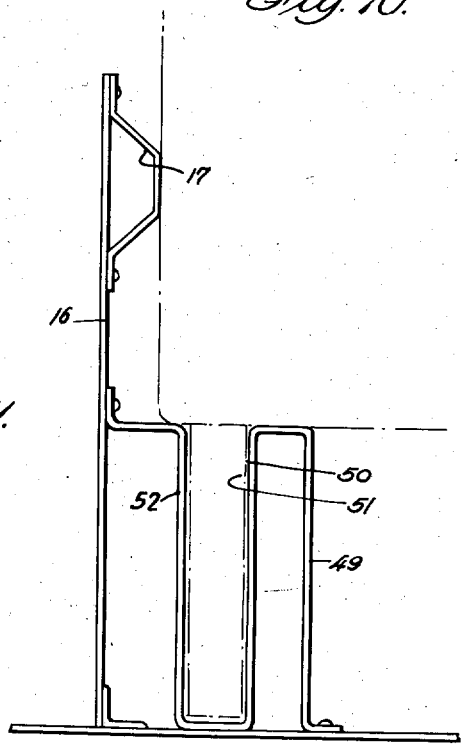
Figure 11 is an end elevation of the shelf support adapted for container legs, the shelf being secured to the car floor and partition.
Figure 12:
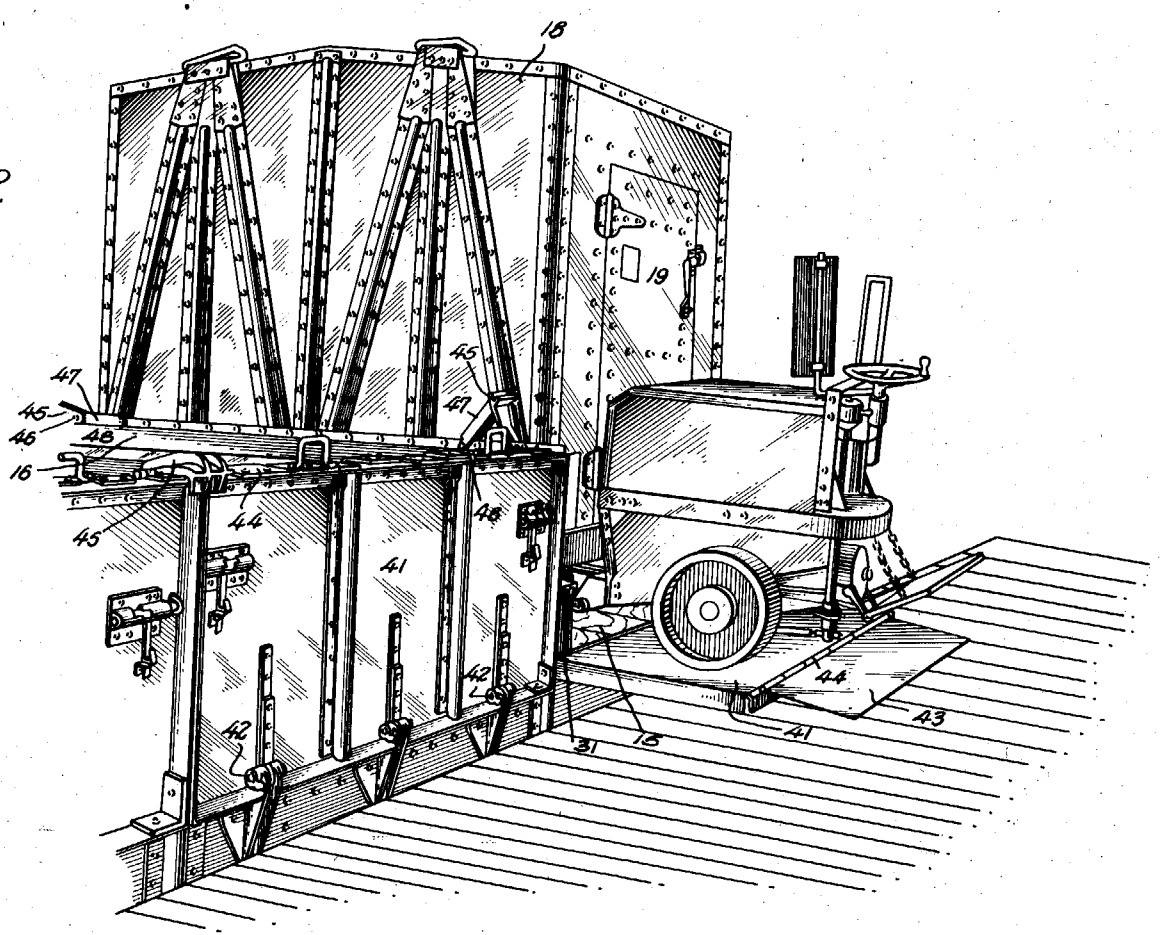
Figure 12 is a perspective view of a portion of a car loaded with containers, and a lift truck on the car under a container in the act of depositing or removing a container from the car.

Some containers have four legs and in order to make my car universal to containers with and without legs I construct the shelf or container support 49 (Figures 10 and 11) with a slot or passage 50 through which the legs 51 of the container slip or travel as the container is moved onto the support; the braces 52 assisting in supporting the load imposed on the shelf 49. I prefer to make these shelves 49 of such height, that when the container 18 rests on them the legs 51 will be free from contact with the floor of the car. With the legs 51 in position in the slots 50 and the weight on the shelves 49 I find it makes a much better load on the car, and the four legs engaging with the slots will act as safety devices, to prevent side sway of the container and decrease to a minimum any possibility of the container getting off the car.

While I have shown the door 19 of the containers against the bulkheads and next to the drop side doors, I prefer that all doors face forward in the direction the car is moving, thereby giving absolute protection against pilfering while the containers are on the car.

As an additional safety against pilfering I provide the locking dog 28 heretofore referred to, which, when the container is resting on a platform cannot be operated, but which could be operated when the container is supported in the shelves 29 and 49. Therefore I provide a rod keyed to the dog 28 and secured to the other end of the rod a locking dog 53, which when the container is supported on the shelves, comes in contact with the upper face of the shelf, as shown in Figure 9, and so long as it is in that position the dog 28 cannot be operated. As stated this locking feature forms the subject matter of another application filed by me.

In using my invention mixed consignments can be handled from point of origin to numerous destinations on a container basis, rather than box car basis; that is to say, load in one container car six or seven containers, with consignments to separate points so that the container car, when ready to run, would have each container for a different destination, loaded with 5,000 up to 10,000 lbs. This would mean that the car would stop at the first destination at which a container is to be removed, and, if there was an empty or loaded container available, it would be loaded on the car. It will also be obvious that by my invention containers could be left out at the desired stations in the middle of the night with no necessity for the station being open, as they would be locked so long as they rest on the station platform and the contents fully as safe as would freight in the station warehouse itself. This should mean in actual operation the saving of a very considerable number of box cars, both as to investment, maintenance, operation over the load, yard switching and what is more important, the saving of station house track space, which is often at a great premium and impossible to increase, except at a prohibitive expense at the larger terminals.

A still further possible and practical use of this container method would be the practical elimination of the way freight service, which means that a peddler car is unloaded manually by train crew at the smaller stations. Through the proper complementary trucking arrangements freight could be left at larger stations and trucked to the smaller stations where it would not be good practice to even stop the train, and many smaller stations which do not handle enough freight traffic to pay the cost of operating the station could be closed and at the same time give shippers and receivers at such points improved service, as compared with what they are now getting.

What I claim is:—

1. In combination, a freight container car having drop sides and transverse bulkheads intermediate its ends, hooks secured to the bulkheads and adapted to engage and support said sides in their elevated positions, and means holding said hook in its operative position.

2. In combination, a freight container car having drop sides, and transverse bulkheads intermediate its ends, hooks secured to the bulkheads and adapted to engage and support said sides in their elevated position, and a safety latch pivoted to the bulkhead and adapted to engage and lock the hook in its operative position.

3. In combination, a container car having transverse bulkheads intermediate its ends dividing the car into compartments, container supports arranged adjacent the bulkheads and adapted to support a container on the car with its bottom above the floor of the car, and container guides secured to the bulkheads above the said supports.

4. In combination, a container car, transverse bulkheads secured on the car intermediate its ends, a container support on two opposite sides of each compartment adapted to support a container with its bottom above the floor of the car, and means on the end of each support to hold the container against transverse movement relative to the car, means to lock said means in its operative position.

5. In combination, a container car, transverse bulkheads secured to said car intermediate its ends dividing the car into compartments adapted to receive containers, a container support on opposite sides of said compartment adapted to support a container on a car, means on each of said supports to hold the container against shifting transversely of the car, and guides to guide the containers in position on each side of the bulkheads.

6. In combination, a container car, bulkheads arranged transversely of the car intermediate its ends and dividing the car into compartments, container supports positioned at opposite sides in each compartment, a stop pivotally secured to each end of the container support, means to move said stop into operative position, and latch to lock said means against movement to hold the stop in its operative position.

7. In combination, a container car, container supports arranged in pairs transversely of said car, movable stops secured to each end of each support and adapted to be moved in a position above the horizontal plane of the support to hold a container on said supports against shifting transversely of the car, and means to lock said stop in its operative position.

8. In combination, a container car, container supports arranged in pairs on said car and extending transversely thereof, and a slot extending from end to end in said supports adapted to receive the legs of containers placed on said supports.

9. The combination with a carrier for a multiplicity of less than the carrier-capacity containers of a sequence of paralleling barrier attachments effective to support the individual containers elevated and restrained as to longitudinal movement, and vertically-swingable gravity-influenced hook devices at the ends of each attachment affording abutments to prevent lateral-shifting of said containers.

10. In combination, a container car having drop sides and transverse bulkheads intermediate its ends, fastening members carried by the bulkheads and adapted to engage and support said sides in their elevated positions, and means for holding said members in operative position.

11. In combination, a container car having drop sides and traverse bulkheads intermediate its ends, fastening members carried by the bulkheads and adapted to engage and support said sides in their elevated position, means for holding said members in operative position, and means to engage and hold the container against lateral shifting movement.

12. In combination, a container car having drop sides, transverse bulkheads secured on the car and forming compartments intermediate its ends, a container support on two opposite sides of each compartment adapted to support a container with its bottom above the floor of the car, means at the end of each support to hold the container against transverse movements relative to the car, and means at the ends of each bulkhead to engage and support the drop sides in elevated position.

13. In combination, a container car, bulkheads arranged transversely of the car intermediate its ends and dividing the car into compartments, container supports positioned at opposite sides in each compartment, a stop pivotally secured to each end of the container support, and a latch to hold the stop in its operative position.

14. In combination, a container car, container supports arranged in pairs transversely of said car, and movable stops secured to each end of each support and adapted to be moved from a position below to a position above the horizontal plane of the supports to hold a container on said supports against shifting transversely of the car.

15. The combination with a container carrier having container receiving spaces, of longitudinally spaced paralleling attachments at opposite sides of each space affording longitudinal movement restraint for the container, vertically swingable members at the ends of such attachments for clamping abutment against the sides of the container to prevent lateral shifting, and means to retain said members in active position with capacity for angular inclination away from the container to release the latter for removal.

16. The combination with a carrier for multiplicity of containers of a sequence of paralleling attachments arranged in spaced pairs, each pair affording elevated and longitudinal movement preventing support for a container, and vertically movable gravity influenced members at the ends of each pair of attachments effective to prevent lateral shifting of the containers.

17. The combination with a container carrier having container receiving spaces, of paralleling attachments arranged in pairs in the respective spaces and affording longitudinal movement restraint for the container, and vertically swingable members mounted upon the ends of such attachments for movement upwardly into clamping abutment against the container to prevent lateral shifting therof.

18. The combination with a container carrier having container receiving compartments, each provided with a floor, of paralleling attachments at the sides of the respective compartments affording elevated and longitudinal movement preventing support for a container to hold the container spaced above the floor so as to admit of the insertion of a lift truck thereunder and so as to hold the container against movement longitudinally of the car, vertically movable gravity influenced members mounted at the ends of the attachments effective to prevent lateral shifting of the containers, and means to retain said members in engaging position during support of the container.

19. In combination with a container carrier having container receiving compartments, of parallel barriers at the sides of each compartment effective to support the container elevated above the bottom of the compartment to provide a lift truck receiving space between the same and the bottom of the compartment and also operative to hold the container from longitudinal movement on the car, a vertically movable door at a side of the car in line with each compartment, and vertically movable devices independent of the door arranged at the ends of the attachments adapted to be disposed in gravity retractible operative and inoperative positions respectively above and below the plane of the bottom of the container and when in such operative position affording abutments to prevent lateral shifting of said containers.

20. The combination with a container carrier of paralleling attachments affording elevated and longitudinal movement preventing support for the container, and gravity-influenced movable means at the ends of such attachments effective to prevent lateral shifting of the container.

21. The combination with a container carrier having a container receiving compartment provided with a floor, of supports at the sides of the compartment for preventing longitudinal movement of the container and holding the container spaced from the floor so as to provide a lift-truck receiving space between the same and the container, a door for closing the compartment, and vertically swingable means independent of the door and arranged at the ends of the attachments affording abutments preventive of lateral shifting of the container when the door is open, said swingable means receding below the container supporting level when releasing said container.

GRAHAM C. WOODRUFF.